(12) United States Patent
Enomoto et al.

(10) Patent No.: US 12,168,483 B2
(45) Date of Patent: Dec. 17, 2024

(54) STEERING APPARATUS

(71) Applicant: Hitachi Astemo, Ltd., Hitachinaka (JP)

(72) Inventors: Satoshi Enomoto, Tochigi (JP);
Hiroaki Mori, Tochigi (JP); Hiroshi Fujita, Tochigi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/911,800

(22) PCT Filed: Oct. 9, 2020

(86) PCT No.: PCT/JP2020/038257
§ 371 (c)(1),
(2) Date: Sep. 15, 2022

(87) PCT Pub. No.: WO2021/205680
PCT Pub. Date: Oct. 14, 2021

(65) Prior Publication Data
US 2023/0119362 A1 Apr. 20, 2023

(30) Foreign Application Priority Data
Apr. 10, 2020 (WO) .................. PCT/JP2020/016090

(51) Int. Cl.
*B62D 3/12* (2006.01)
*B62D 5/04* (2006.01)
*F16H 25/22* (2006.01)

(52) U.S. Cl.
CPC ............ *B62D 5/0445* (2013.01); *B62D 3/12* (2013.01); *B62D 5/0424* (2013.01); *F16H 25/2204* (2013.01)

(58) Field of Classification Search
CPC ...... B62D 5/0445; B62D 3/12; B62D 5/0424; F16H 25/2204
See application file for complete search history.

(56) References Cited

U.S. PATENT DOCUMENTS

2019/0047612 A1 2/2019 Lee

FOREIGN PATENT DOCUMENTS

| JP | 59-170064 U | 11/1984 |
|----|-------------|---------|
| JP | 2006-069517 | 3/2006 |
| JP | 2015-168371 | 9/2015 |
| JP | 2016-136031 | 7/2016 |

(Continued)

OTHER PUBLICATIONS

Translation of KR-20120106120-A (Woo) (Year: 2012).*

(Continued)

*Primary Examiner* — Randell J Krug
(74) *Attorney, Agent, or Firm* — Rankin, Hill & Clark LLP

(57) ABSTRACT

A steering apparatus includes a turning shaft movable in a vehicle widthwise direction, a pinion shaft meshed with the turning shaft and a first housing that retains therein the turning shaft and the pinion shaft. An inner circumferential surface of the first housing facing with the turning shaft is provided with an inclined portion that continuously changes an internal diameter. When a portion where a tooth of the turning shaft and a tooth of the pinion shaft are meshed with each other is defined as a meshed portion, the inclined portion is formed below at least the meshed portion.

8 Claims, 9 Drawing Sheets

(56) References Cited

FOREIGN PATENT DOCUMENTS

JP            6242549 B1 * 12/2017 .............. B62D 1/19
KR      20120106120 A  *  9/2012

OTHER PUBLICATIONS

Translation of JP-6242549-B1 (Terada) (Year: 2017).*
International Search Report, International Application No. PCT/JP2020/038257, Date of mailing: Nov. 2, 2020, 2 pages.

* cited by examiner

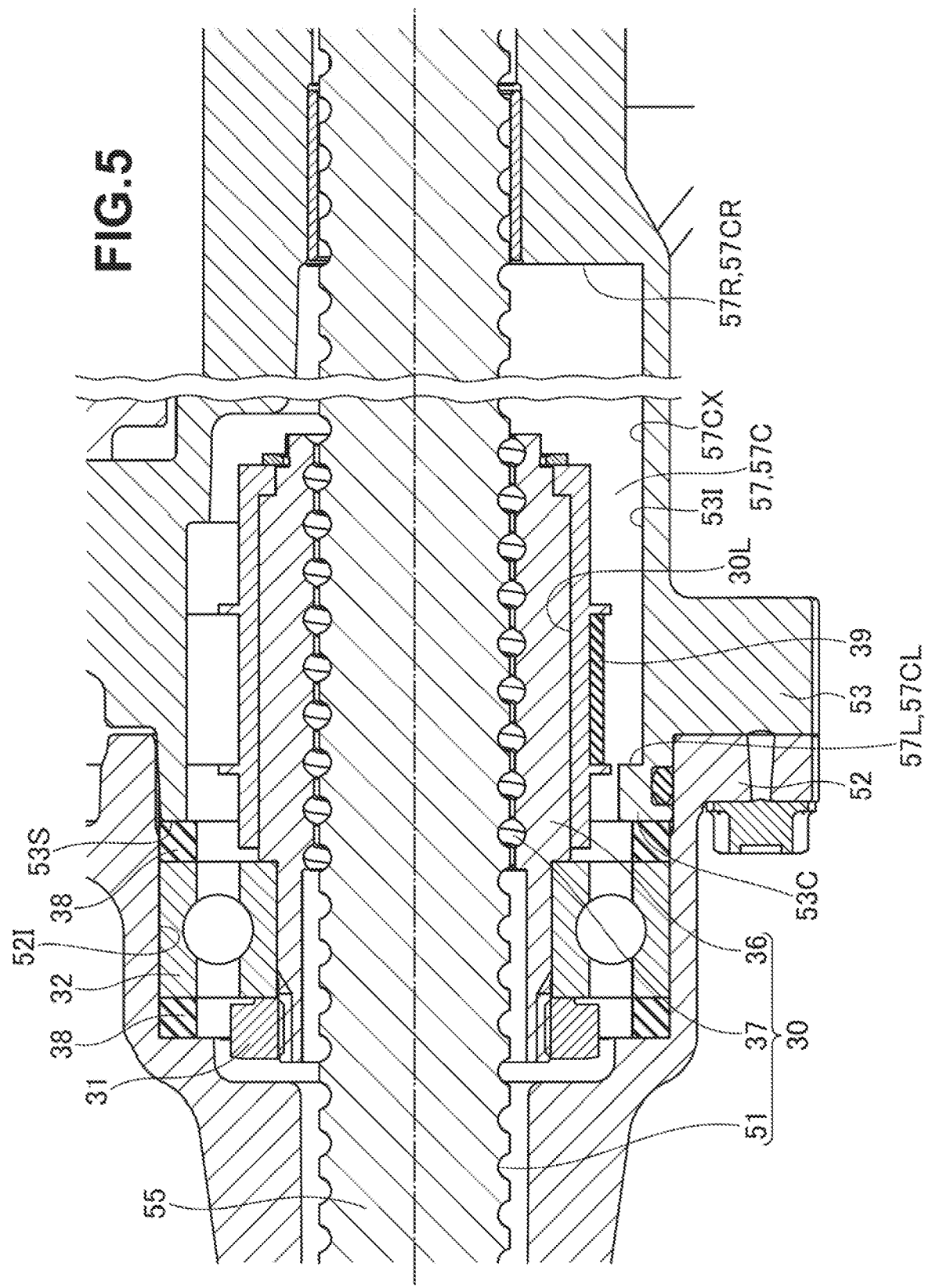

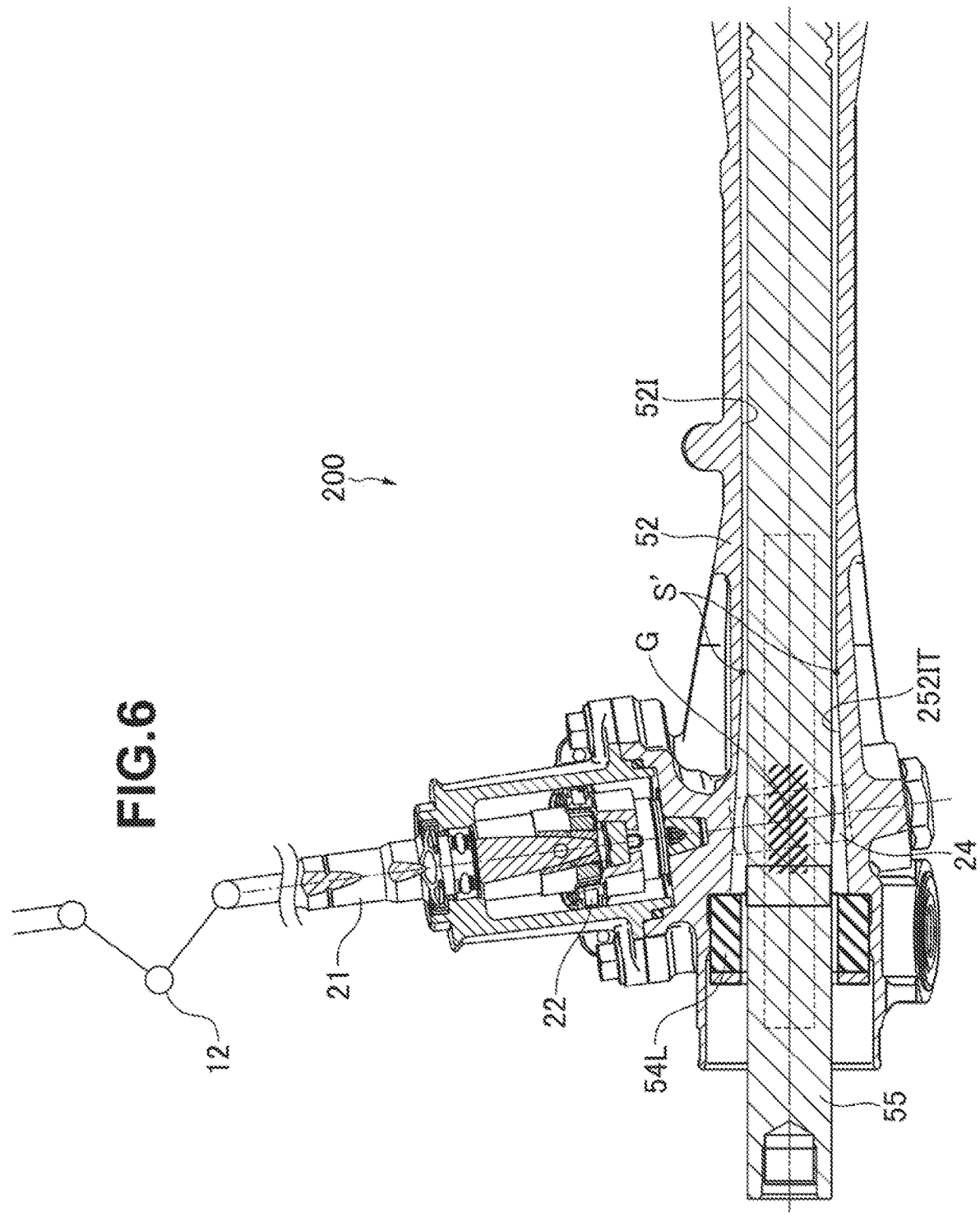

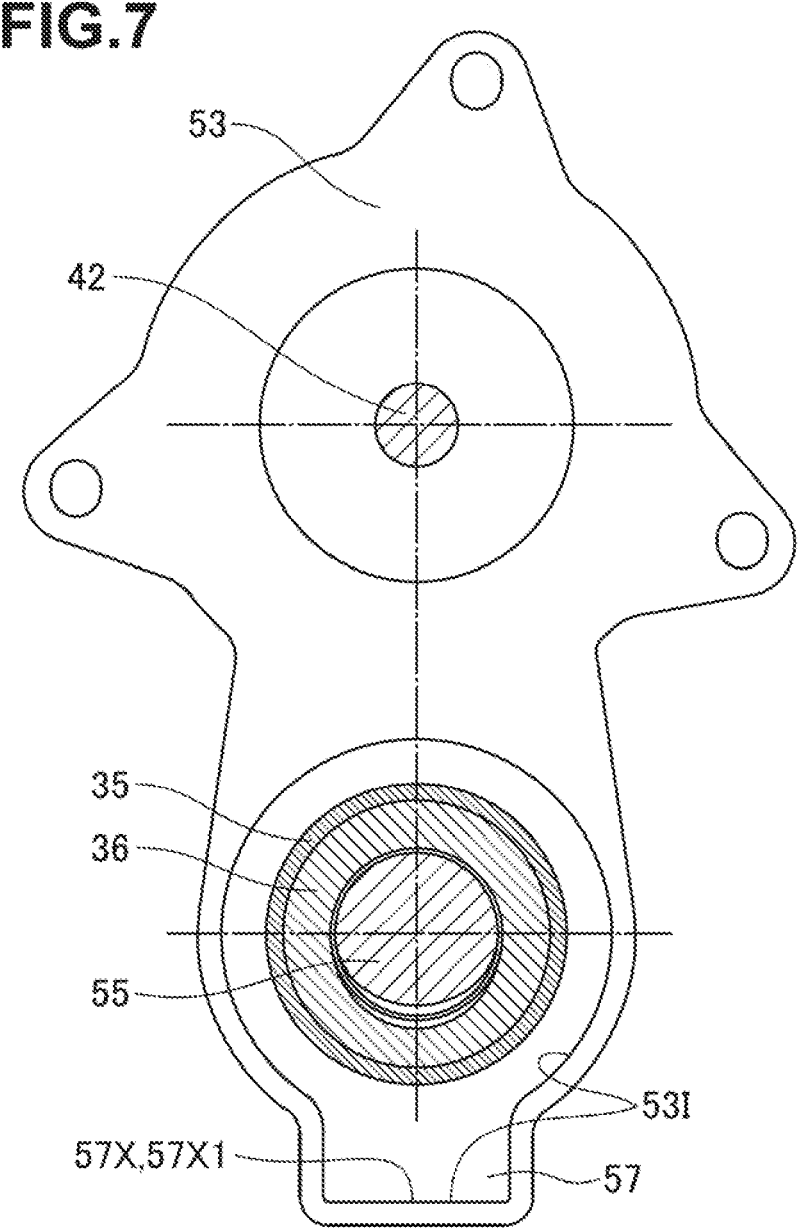

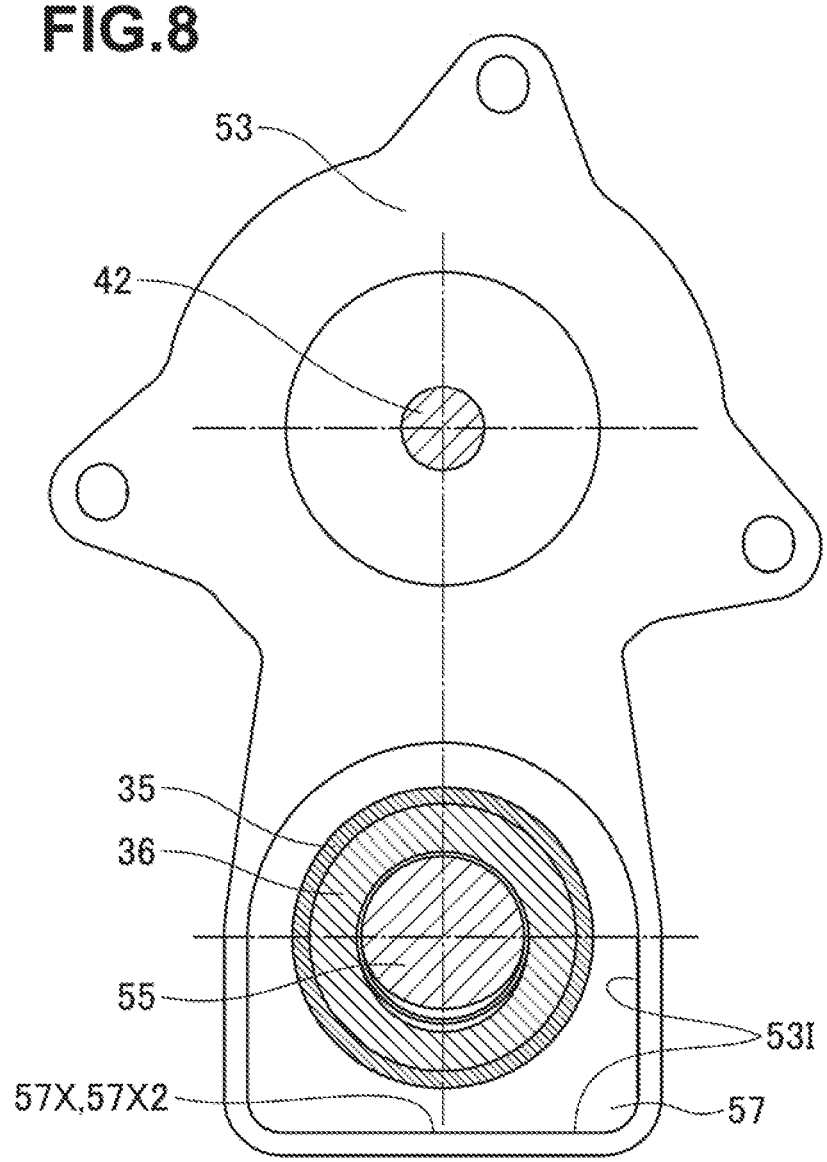

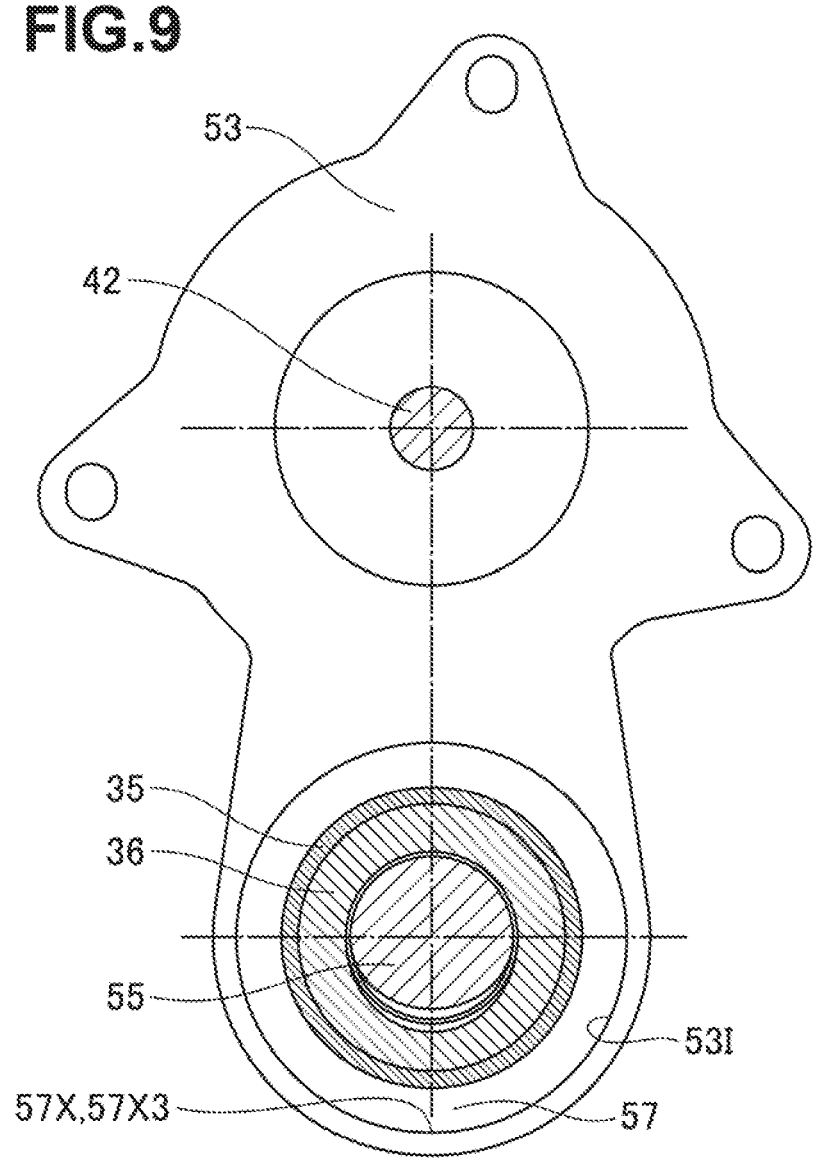

STEERING APPARATUS

TECHNICAL FIELD

The present disclosure relates to a steering apparatus.

BACKGROUND ART

A steering apparatus is applied to a vehicle for steering. As for a technology regarding such a steering apparatus, Patent Document 1 discloses an electrically-assisted power steering device that includes an electric motor, a rack shaft coupled to a steering mechanism, and a power transmission mechanism that transmits power from the electric motor to the rack shaft. The power transmission mechanism includes a screw shaft which is coupled to or integrated with the rack shaft and which is provided with a male-screw thread, a nut which is placed around the screw shaft and which is provided with a female-screw thread, a plurality of rolling elements capable of rolling within a rolling passage formed between the male-screw thread and the female-screw thread, and a sleeve that includes a receiving portion which receives the power transmitted from the electric motor. The nut is internally fitted to the sleeve in such a way that the receiving portion is located outwardly in the radial direction relative to the rolling passage, and is to rotate together with such a sleeve.

CITATION LIST

Patent Literatures

Patent Document 1: JP2006-069517A

SUMMARY OF INVENTION

Technical Problem

The electrically-assisted power steering device disclosed in Patent Document 1 has a possibility such that water enters in a casing in which the ball screw, etc., is stored through, for example, matching surfaces of the respective components, and a belt that links the ball screw with a drive source is soaked with such entering water. When, not only the belt but also a component to transmit the power is soaked with water and when it becomes a low-temperature environment at which freezing occurs, there is a technical disadvantage such that the component to transmit the power is frozen up and thus the performance of the steering apparatus is likely to decrease.

Hence, an objective of the present disclosure is to provide a steering apparatus that can maintain a performance under a freezing-temperature environment.

Solution to Problem

Upon keen research and development, the inventors of the present disclosure reached technical knowledges to cause the inner circumferential surface of the first housing in which the turning shaft and the pinion shaft are retained to be an inclined portion that continuously changes the internal diameter, the inner circumferential surface facing with the turning shaft, and to form the inclined portion below a meshed portion where the tooth of the turning shaft and the tooth of the pinion shaft are meshed with each other. By providing the inclined portion, water flows along the inclined portion from the lower section relative to the meshed portion. Hence, water is suppressed to be trapped below the meshed portion. Accordingly, it can be thought that a steering apparatus is facilitated to maintain the performance even under a freezing-temperature condition. The present disclosure has been proposed in view of such technical knowledges. The present disclosure will be described below.

A steering apparatus according to the present disclosure includes:
- a turning shaft movable in a vehicle widthwise direction;
- a pinion shaft meshed with the turning shaft; and
- a first housing that retains therein the turning shaft and the pinion shaft,
- in which an inner circumferential surface of the first housing facing with the turning shaft is provided with an inclined portion that continuously changes an internal diameter, and
- in which when a portion where a tooth of the turning shaft and a tooth of the pinion shaft are meshed with each other is defined as a meshed portion, the inclined portion is formed below at least the meshed portion.

Advantageous Effects of Invention

According to the present disclosure, a steering apparatus can be provided which can maintain the performance under a freezing-temperature environment.

BRIEF DESCRIPTION OF DRAWINGS

FIG. 5 is a diagram illustrating a retaining portion 57C and the surroundings thereof according to another modified example;

FIG. 6 is a diagram illustrating a part of an electrically-assisted power steering device 200 in an enlarged manner;

FIG. 7 is a diagram illustrating an example form of a bottom portion of the retaining portion 57;

FIG. 8 is a diagram illustrating an example form of the bottom portion of the retaining portion 57; and FIG. 9 is a diagram illustrating an example form of the bottom portion of the retaining portion 57.

DESCRIPTION OF EMBODIMENTS

An electrically-assisted power steering device that is an example steering apparatus of the present disclosure will be described below with reference to the figures as needed. Note that the embodiments illustrated in the figures are merely examples of the present disclosure, and the present disclosure is not limited to the illustrated embodiments.

1. First Embodiment

Figure 1:
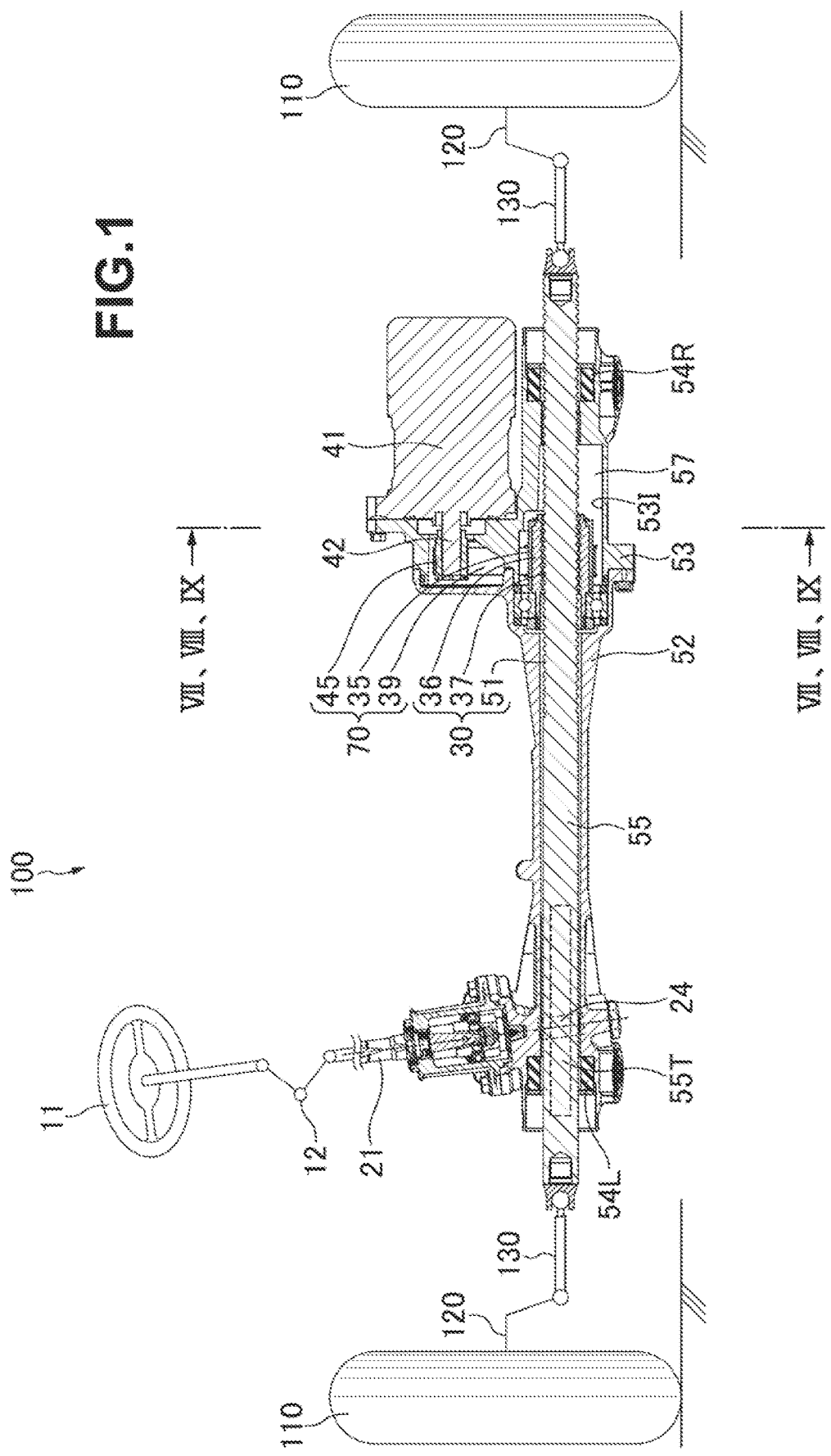
FIG. 1 is a diagram for describing an electrically-assisted power steering device 100.

As illustrated in FIG. 1, an electrically-assisted power steering device 100 includes tie-rod ends 130 and 130 coupled to right and left wheels 110 and 110, respectively, through respective knuckles 120 and 120, and a rack shaft 55 coupled to the tie-rod ends 130 and 130. According to the electrically-assisted power steering device 100, steering force from a steering wheel 11 provided for a vehicle is transmitted to the rack shaft 55. A rack-and-pinion mechanism is formed by rack teeth 55 formed on the rack shaft 55 and pinion teeth 24 formed on the pinion shaft 21. The steering wheel 11 and the pinion shaft 21 are connected through an intermediate shaft 12, and the steering force from the steering wheel 11 is input to the intermediate shaft 12. Moreover, an unillustrated torsion bar is provided between the pinion shaft 21 and the intermediate shaft 12.

Furthermore, the electrically-assisted power steering device 100 includes a motor 41 and a motor shaft 42 that is one of transmitting means that transmits drive force by the motor 41. The drive force by the motor 41 is transmitted to the rack shaft 55 as steering assist force through the motor shaft 42. This assists the movement of the rack shaft 55.

Figure 2:
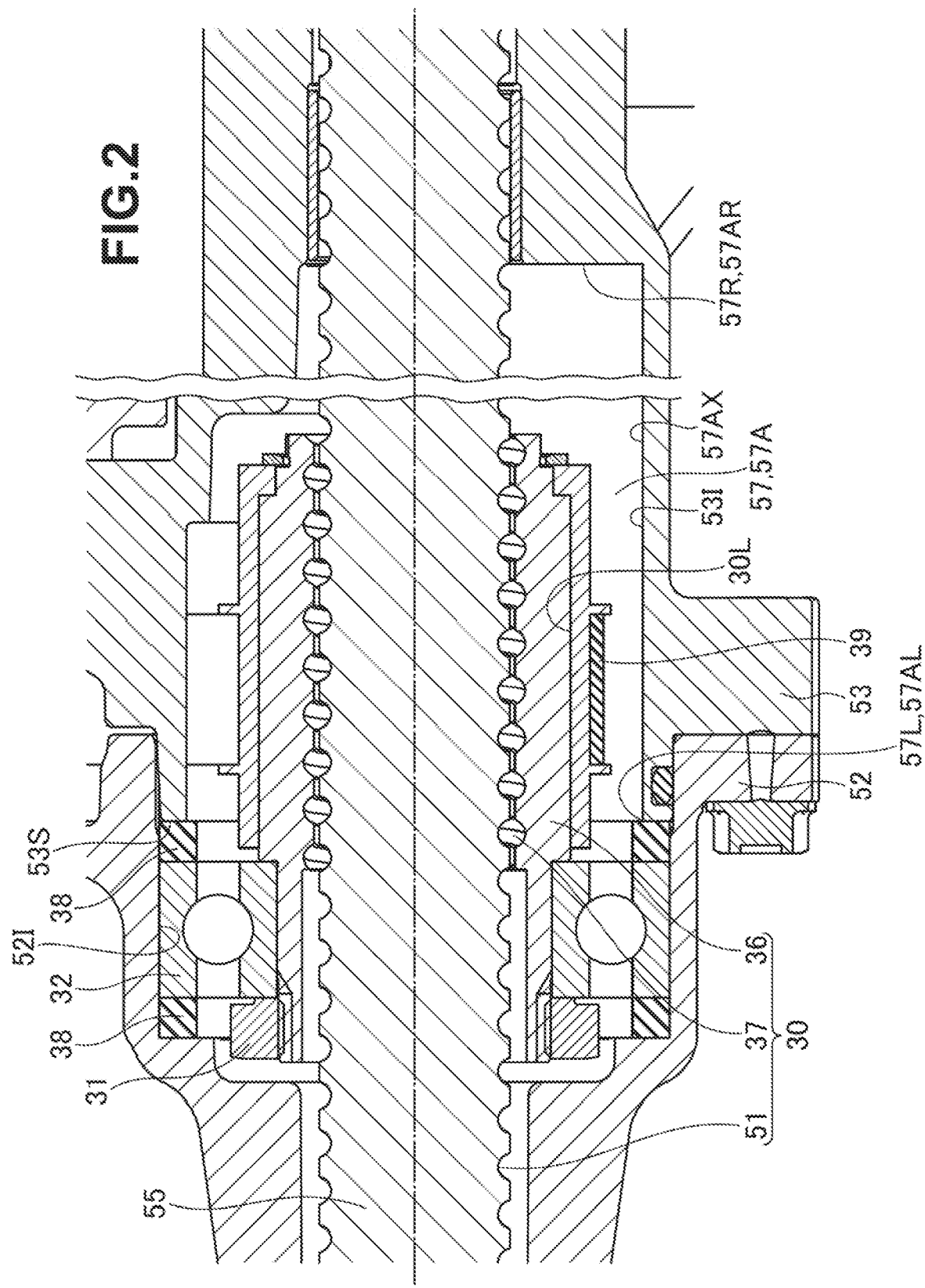
FIG. 2 is a diagram illustrating a retaining portion 57A and the surroundings thereof according to a first embodiment in an enlarged manner.

As illustrated in FIG. 1, the electrically-assisted power steering device 100 includes a first housing 52 and a second housing 53, and a retaining portion 57 at an inner circumferential surface 531 of the second housing 53 (in the following description, the retaining portion 57 of the first embodiment will be also referred to as a "retaining portion 57A"). The first housing 52 retains therein the rack shaft 55 that extends toward a side apart from the motor 41, and the second housing 53 retains therein the ball screw 30 and a transmission belt mechanism 70. As illustrated in FIG. 1 and FIG. 2, the retaining portion 57A includes a lower end surface 57AX provided below a lower end surface 30L of the ball screw 30 and the lower end surface of the transmission belt mechanism 70 (in the following description, the lower end surface of the retaining portion 57A may be also referred to as a "bottom portion 57AX"), and water entering in the second housing 53 can be trapped at the bottom portion 57AX.

The ball screw 30 is a kind of conversion mechanisms that converts rotational motion into linear motion, and transmits the drive force generated by the motor 41, i.e., assist torque, to the rack shaft 55. The ball screw 30 includes a ball screw portion 51 formed on the rack shaft 55, a plurality of balls 37, and a ball housing 36 coupled to the ball screw portion 51 through the balls 37. The ball housing 36 is supported by the first housing 52 so as to be freely rotatable through a bearing 32, and the movement is restricted in such a way that the ball housing 36 does not move in the axial direction of the rack shaft 55 independently from the bearing 32. The bearing 32 is fitted in an inner circumferential surface 521 of the first housing 52, and the inner race of the bearing 32 is fastened between a screw 31 and the ball housing 36 with such a race being depressed against the ball housing 36 by the screw 31. As illustrated in FIG. 2, an outer race of the bearing 32 has respective end surfaces in the axial direction of the rack shaft 55 held between elastic bodies 38, and the elastic bodies 38 are supported by the first housing 52 and by an end surface 53S with such an outer race being held between the first housing 52 and the end surface 53S of the second housing 53.

As illustrated in FIG. 1, the transmission belt mechanism 70 includes a drive pulley 45 provided at the motor shaft 42, a driven pulley 35 provided at the ball housing 36, and a belt member 39 tensioned between the drive pulley 45 and the driven pulley 35.

As illustrated in FIG. 1 and FIG. 2, the electrically-assisted power steering device 100 has the retaining portion 57A at a portion of the second housing 53 at the side of a matching surface with the first housing 52. The retaining portion 57A has a first end portion 57AR in the axial direction of the rack shaft 55 placed between a rack end stopper 54R that is placed at an end of the rack shaft 55 at the motor-41 side and the belt member 39. Moreover, a second end portion 57AL that is an end portion at the belt-member-39 side relative to the first end portion 57AR in the axial direction of the rack shaft 55 is located at the pinion-shaft-21 side relative to both end surfaces of the belt member 39 in the axial direction of the rack shaft 55, and is an opening opened in the end surface of the second housing 53 facing with the elastic body 38 (i.e., an end surface 53S of the second housing 53 at the first-housing-52 side). By employing such a structure, since the elastic body 38 can be placed between the retaining portion 57A and the bearing 32, in comparison with a case in which no elastic body 38 is present, water that enters in the second housing 53 is not likely to contact the bearing 32. Consequently, the bearing 32 becomes not likely to be rusted out.

Moreover, since the second end portion 57AL is opened in the end surface 53S of the second housing 53, in a casting process of the second housing 53, a die for an inner-dimeter portion can be taken out in the opening direction. Consequently, an advantageous effect such that the easiness of casting improves can also be achieved.

The lower end surface of the retaining portion 57A is the bottom portion 57AX. The bottom portion 57AX is provided below a lower end surface 30L of the ball screw 30. More specifically, the bottom portion 57AX is placed below the belt member 39 that passes through the lower end surface of the ball housing 36 of the ball screw 30.

By providing the bottom portion 57AX below the lower end surface 30L of the ball screw 30 and the lower surface of the belt member 39, even if water enters in the second housing 53, such water can be trapped at the bottom portion 57AX. This prevents the ball screw 30 and the belt member 39 from being soaked with such water, and thus the electrically-assisted power steering device 100 can maintain the performance under a freezing-temperature environment.

In the retaining portion 57A, regarding the positions of the upper surface of the elastic body 38 placed below the rack shaft 55 and of the bottom portion 57AX in the vertical direction, either one may be located at the upper side. However, from the standpoint such that the electrically-assisted power steering device 100 can maintain the performance under a freezing-temperature environment by causing water entering in the second housing 53 to be easily trapped, it is preferable that the bottom portion 57AX should be placed below the upper surface of the elastic body 38 placed below the rack shaft 55.

Figure 3:
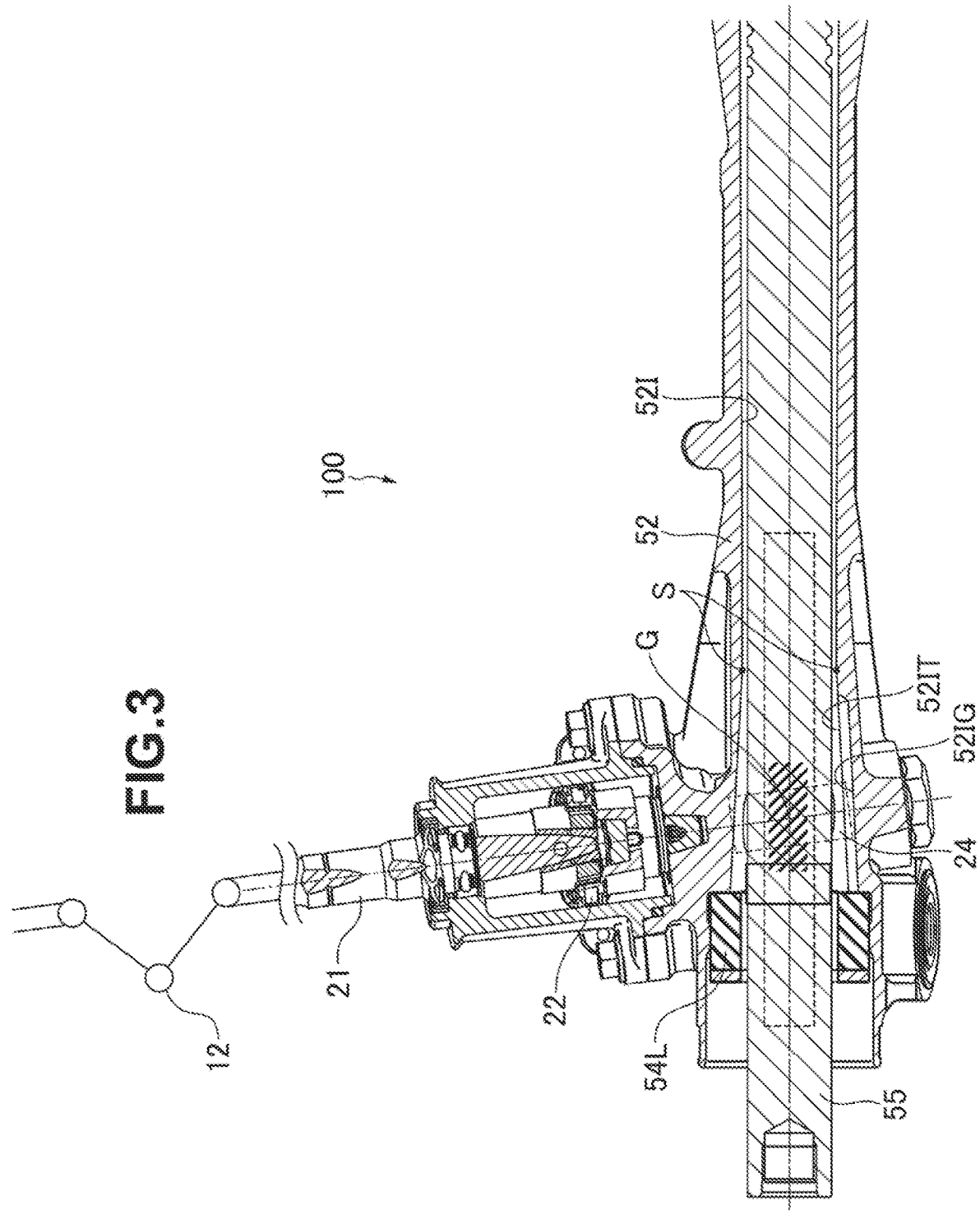
FIG. 3 is a diagram illustrating a part off the electrically-assisted power steering device 100 in an enlarged manner.

Conversely, as illustrated in FIG. 1 and FIG. 3, the first housing 52 retains therein the rack shaft 55. The inner circumferential surface 521 of the first housing 52 and the outer circumferential surface of the rack shaft 55 are not in contact with each other, but a clearance is formed therebetween. Moreover, the electrically-assisted power steering device 100 includes a torque sensor 22 that detects the steering torque applied to the steering wheel 11.

In the electrically-assisted power steering device 100, regarding the distance between the inner circumferential surface 521 of the first housing 52 and the outer circumferential surface of the rack shaft 55, it is far at a portion that surrounds a meshed portion G where the rack tooth 55T formed on the rack shaft 55 and the pinion tooth 24 formed on the pinion shaft 21 are meshed with each other, and the above-described distance becomes close as coming close to, from such a portion, the coupled portion between the first housing 52 and the second housing 53. The first housing 52 includes an inclined portion 52IT which is formed at the inner circumferential surface 521 and which becomes thin as coming close to the coupled portion between the first housing 52 and the second housing 53. The inclined portion 52IT is provided at a part of the inner circumferential surface 521, and a start point S of the inclined portion 52IT is located at the motor-41 side relative to the meshed portion G where the tooth 55T of the rack shaft 55 and the tooth 24 of the pinion shaft 21 are meshed with each other. The rack end stopper 54L is provided at the end portion of the rack shaft 55 at the pinion-shaft-21 side.

As illustrated in FIG. 3, the electrically-assisted power steering device 100 includes the first housing 52 that retains therein the rack shaft 55 and the pinion shaft 21. A part of the inner circumferential surface 521 of the first housing 52 facing with the rack shat 55 is formed as the inclined portion 52IT that continuously changes the internal diameter. The inclined portion 52IT is formed below the meshed portion G where the tooth 55T of the rack shaft 55 and the tooth 24 of the pinion shat 21 are meshed with each other. By providing the inclined portion 52IT, water flows from the lower site of the meshed portion G along the inclined portion 52IT. This prevents water from being accumulated below the meshed portion G. Accordingly, the meshed portion G is prevented from being frozen up under a freezing-temperature environment, facilitating the electrically-assisted power steering device 100 to maintain the performance.

The electrically-assisted power steering device 100 further includes, in addition to the inclined portion 52IT, a groove portion 52IG which is formed at, so as to face with the rack shaft 55, the inner circumferential surface 521 of the first housing 52 located below the rack shat 55, and which has an opened upper end and a lower end as a bottom portion. By providing such a groove portion 52IG, even if water enters in the first housing 52, such water can be trapped at the groove portion 52IG. Furthermore, by providing the inclined portion 52IT, even if water enters in the first housing 52, it is difficult for the water trapped below the rack shaft 55 to move toward the second-housing-53 side. Accordingly, since the amount of water that flows in the second housing 53 from the first housing 52 can be reduced, the ball screw 30 and the belt member 39 can be further prevented from being soaked with such water. That is, by providing the retaining portion 57A, the inclined portion 52IT, and the groove portion 52IG, the ball screw 30 and the belt member 39 can be prevented from being soaked with water. Therefore, according to the first embodiment of the present disclosure, the electrically-assisted power steering device 100 can be provided which can maintain the performance under a freezing-temperature environment.

In the above description relating to the first embodiment, although a structure has been described in which the second end portion 57AL in the axial direction of the rack shaft 55 is located at the pinion-shaft-21 side relative to both end surfaces of the belt member 39 in the axial direction of the rack shaft 55, and is an opening which is opened in the end surface 53S of the second housing 53 facing the elastic body 38, the first embodiment is not limited to this structure. The second end portion of the retaining portion can be in other forms. The other forms thereof will be described below.

Figure 4:
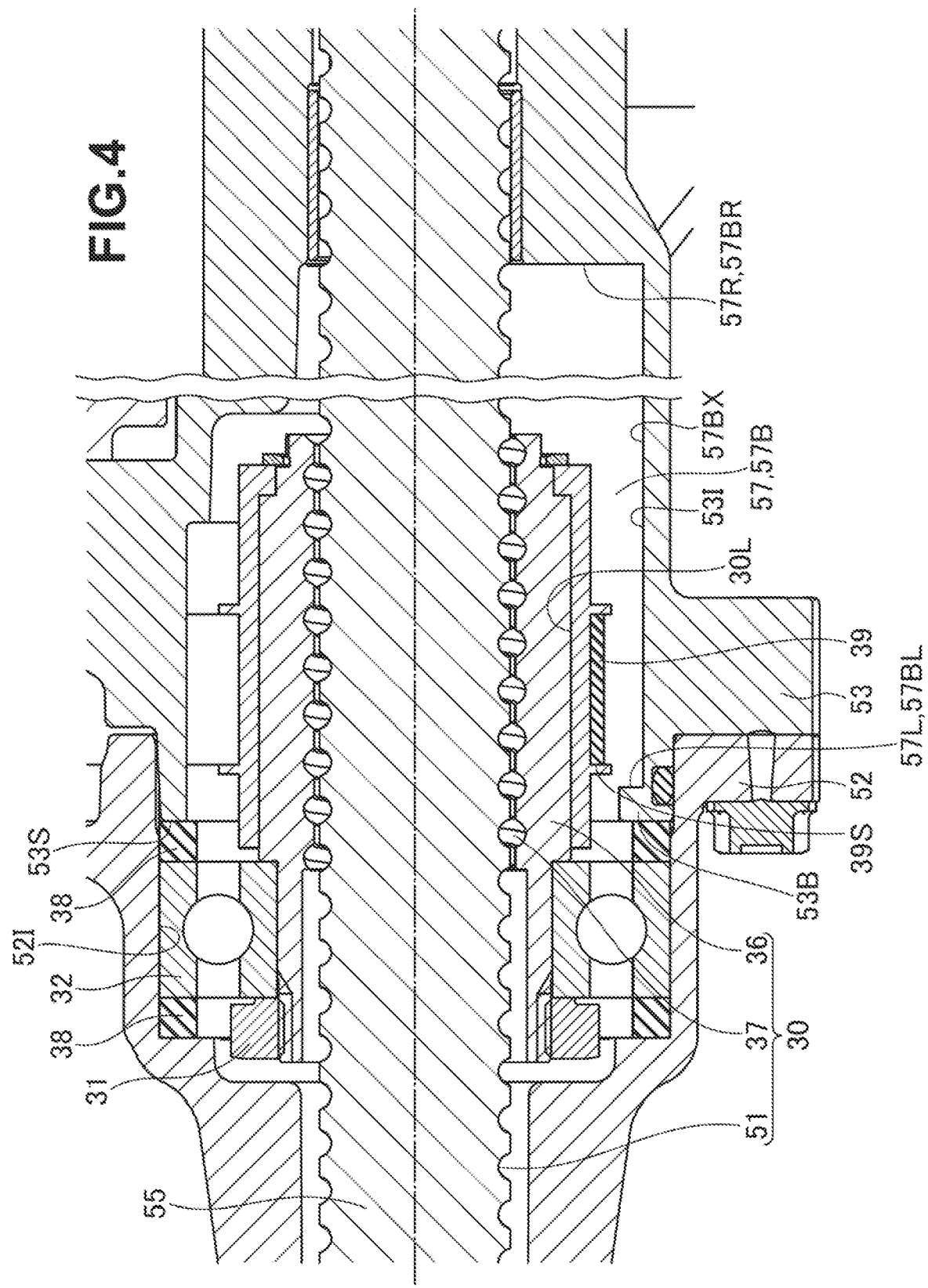
FIG. 4 is a diagram illustrating a retaining portion 57B and the surroundings thereof according to a modified example.

FIG. 4 is a diagram for describing a retaining portion 57B that is in a different form from that of the above-described retaining portion 57A. The retaining portion 57B illustrated in FIG. 4 has a first end 57BR located at the similar position to that of the above-described first end 57AR, but the form of a second end portion 57BL differs from that of the second end portion 57AL. The second end portion 57BL of the retaining portion 57B has a position in the axial direction of the rack shaft 55 that is the same as the position of a side face of, at the rack-end-stopper-54R side, a convexity 53B provided at the end of a bottom portion 57BX in the retaining portion 57B at the elastic-body-38 side. In other words, the second end portion 57BL is located between the position of a side face 39S of the belt member 39 at the pinion-shaft-21 side, and an end surface 53S of the second housing 53 at the pinion-shaft-21 side. By employing such a form, it becomes easy to trap water in the retaining portion 57B by what corresponds to the height of the convexity 53B. Consequently, since it becomes easy to prevent the belt member 39 from being soaked with water, the electrically-assisted power steering device 100 can maintain the performance under a freezing-temperature environment.

FIG. 5 is a diagram for describing a retaining portion 57C that is in a different form from those of the above-described retaining portions 57A and 57B. The retaining portion 57C illustrated in FIG. 5 has a first end portion 57CR located at the similar position to that of the above-described first end portion 57AR, but the form of a second end portion 57CL differs from those of above-described second end portions 57AL and 57BL. The second end portion 57CL of the retaining portion 57C has a position in the axial direction of the rack shaft 55 located at the belt-member-39 side relative to the position of the second end portion 57BL. In other words, the second end portion 57CL is located below the side face 39S of the belt member 39 at the pinion-shaft-21 side. That is, the position of the end surface 39S and the position of the second end portion 57CL in the axial direction of the rack shaft 55 are consistent with each other. In comparison with the retaining portion 57B illustrated in FIG. 4, the retaining portion 57C illustrated in FIG. 5 has a width (a length in the axial direction of the rack shaft 55) of a convexity 53C provided at an end of a bottom portion 57CX in the retaining portion 57 at the elastic-body-38 side wider than the width of the above-described concavity 53B. According to such a form, also, it becomes easy to trap water in the retaining portion 57C by what corresponds to the height of the convexity 53C. Consequently, since it becomes easy to prevent the belt member 39 from being soaked with water, the electrically-assisted power steering device 100 can maintain the performance under a freezing-temperature environment.

2. Second Embodiment

FIG. 6 is a diagram illustrating a part of an electrically-assisted power steering device 200 that is an example steering apparatus according to a second embodiment of the present disclosure in an enlarged manner. The electrically-assisted power steering device 200 employs the same structure as that of the above-described electrically-assisted power steering device 100 except that the groove portion 52IG is not provided. In FIG. 6, the same component as that of the electrically-assisted power steering device 100 will be denoted by the same reference numeral utilized in FIG. 3, and the detailed description thereof will be omitted.

Instead of the first housing 52 of the electrically-assisted power steering device 100, the electrically-assisted power steering device 200 includes a first housing 252. As illustrated in FIG. 6, the first housing 252 does not include a structural component corresponding to the above-described groove portion 52IG, but includes an inclined portion 252IT corresponding the inclined portion 52IT. Hence, the electrically-assisted power steering device 200 according to the second embodiment can also accomplish the advantageous effects of the present disclosure. Moreover, a start point S' of the inclined portion 252IT is present at the second-housing side relative to the meshed portion G. By providing the inclined portion 252IT, even if water enters in the first housing 252, the water trapped below the rack shaft 55 is prevented from moving toward the unillustrated second-housing side. This reduces the amount of water that flows in the second housing from the first housing 252, and thus the ball screw and the belt member retained in the second housing are suppressed to be soaked with such water. Hence, according to the second embodiment of the present disclosure, the electrically-assisted power steering device 200 can be provided which can maintain the performance under a freezing-temperature environment.

In the above description regarding the present disclosure, a form in which the retaining portions 57A, 57B, and 57C (those may be collectively referred to as the "retaining portion 57" below, and the bottom portion of the retaining portion 57 may be referred to as the "bottom portion 57X") has been described as examples. A form that the bottom portion 57X can take will be described below with reference to FIG. 7 to FIG. 9.

FIG. 7 is a diagram illustrating a cross section taken along a line VII-VII in FIG. 1. The bottom portion 57X of the retaining portion 57 may be in, for example, a form of a bottom portion 57X1 illustrated in FIG. 7. That is, the bottom portion 57X has the width in the vehicle back-and-forth direction smaller than the inner diameter of the driven pulley 35 and the outer diameter of the ball housing 36, thus being in a convex shape protruding toward the lower side of the second housing 53. By applying such a form, water can be trapped in the retaining portion 57 that protrudes downwardly. Hence, an electrically-assisted power steering device can be provided which can maintain the performance under a freezing-temperature environment by providing such a retaining portion 57.

FIG. 8 is a diagram illustrating a cross section taken along a line VIII-VIII in FIG. 1. The bottom portion 57X of the retaining portion 57 may be in, for example, a form of a bottom portion 57X2 illustrated in FIG. 8. That is, the bottom portion 57X can have the width in the vehicle back-and-forth direction substantially the same as the width in the vehicle back-and-forth direction at a portion of the second housing 53 where the driven pulley 35 is retained. Such a form can also trap water in the retaining portion 57. Hence, an electrically-assisted power steering device can be provided which can maintain the performance under a freezing-temperature environment by providing such a retaining portion 57.

FIG. 9 is a diagram illustrating a cross section taken along a line IX-IX in FIG. 1. The bottom portion 57X of the retaining portion 57 may be in, for example, a form of a bottom portion 57X3 illustrated in FIG. 9. That is, the bottom portion 57X can be formed in a curved surface shape protruding downwardly. Such a form can also trap water in the retaining portion 57. Hence, an electrically-assisted power steering device can be provided which can maintain the performance under a freezing-temperature environment by providing such a retaining portion 57.

The above-described electrically-assisted power steering devices 100 and 200 accomplish the following advantageous effects. In the following description, the first end portions 57AR, 57BR, and 57CR may be collectively referred to as the "first end portion 57R", and the second end portions 57AL, 57BL, and 57CL may be collectively referred to as the "second end portion 57L".

In the electrically-assisted power steering devices 100 and 200, it is preferable that the inner circumferential surface 521 of the first housing 52 facing with the rack shaft 55 should include the inclined portion 52IT or 252IT that decreases the internal diameter toward the motor-41 side from the pinion-shaft-21 side, and the start point S or S' of the inclined portion 52IT or 252IT should be located at the motor-41 side relative to the meshed portion G where the tooth 55T of the rack shaft 55 and the tooth of the pinion shaft 21 are meshed with each other.

According to the electrically-assisted power steering devices 100 and 200 with such a structure, in order to move toward the second-housing-53 side, it is necessary for water that enters in the first housing 52 or 252 to move beyond the inclined portion 52IT or 252IT. Since the water that enters in the first housing 52 or 252 is trapped below the rack shaft 55, the inclined portion 52IT or 252IT serves as an uphill for such water. It is difficult for such water to go over the uphill. Since it is difficult for the water that enters in the first housing 52 or 252 to move to the second housing 53 because the first housing 52 or 252 includes the inclined portion 52IT or 252IT, the amount of water that enters in the second housing 53 can be reduced. This makes it further difficult for such water to contact the belt member 39, the belt member 39 is not likely to become a state difficult to actuate under a low-temperature environment at which freezing occurs. Hence, by adopting a structure in which the inclined portion 52IT or 252IT is provided, the electrically-assisted power steering devices 100 and 200 can be provided which are further facilitated to maintain the performance under a freezing-temperature environment.

Moreover, in each of the electrically-assisted power steering devices 100 and 200, the second end portion 57L of the retaining portion 57 which is located at the belt-member-39 side relative to the first end portion 57R in the axial direction of the rack shaft 55 may be located at the pinion-shat-21 side relative to both side faces of the belt member 39 in the axial direction, and may be an opening opened in the end surface 53S of the second housing 53 at the first-housing-52 side.

According to such a structure, since the retaining portion 57 is provided below the lower end surface of the belt member 39, water entering in the second housing 53 is not likely to contact the belt member 39. Accordingly, the electrically-assisted power steering devices 100 and 200 can be provided which can maintain the performance under a freezing-temperature environment.

Furthermore, in each of the electrically-assisted power steering devices 100 and 200, the second end portion 57L of the retaining portion 57 located at the belt-member-39 side relative to the first end portion 57R in the axial direction of the rack shaft 55 may have a position in the axial direction of the rack shaft 55 located between the position of the side face 39S of the belt member 39 at the pinion-shaft-21 side and the end surface 53S of the second housing 53 at the pinion-shaft-21 side.

According to such a structure, also, since the retaining portion 57 is provided below the lower end surface of the belt member 39, the water that enters in the second housing 53 is not likely to contact the belt member 39. Accordingly, the electrically-assisted power steering devices 100 and 200 can be provided which can maintain the performance under a freezing-temperature environment.

Still further, in the electrically-assisted power steering device 100 that includes the inclined portion 521T, it is preferable that the inner circumferential surface 521 of the first housing 52 which faces with the rack shaft 55 and which is located at least below the rack shaft 55 should include the groove portion 521G which is located at the pinion-shaft-21 side relative to the start point S and which has an opened upper surface.

According to the electrically-assisted power steering device 100 with such a structure, water that attempts to go over the inclined portion 521T to move can be trapped in the groove portion 521G. Since it becomes difficult for the water that enters in the first housing 52 to move to the second housing 53 by providing the groove portion 521G, the amount of water that enters in the second housing 53 can be reduced. This further makes it difficult for the water to contact the belt member 39, and thus the belt member 39 is not likely to become a state difficult to actuate under a low-temperature environment at which freezing occurs. Hence, by adopting a structure provided with the groove portion 52IG, the electrically-assisted power steering device 100 can be provided which is further facilitated to maintain the performance under a freezing-temperature environment.

Moreover, in each of the electrically-assisted power steering devices 100 and 200, the second end portion 57L of the retaining portion 57 located at the belt-member-39 side relative to the first end portion 57R in the axial direction of the rack shaft 55 may have the same position in the axial direction of the rack shaft 55 as the position of the side face 39S of the belt member 39 at the pinion-shaft-21 side.

According to such a structure, also, since the retaining portion 57 is provided below the lower end surface of the belt member 39, the water that enters in the second housing 53 is not likely to contact the belt member 39. Accordingly, the electrically-assisted power steering devices 100 and 200 can be provided which can maintain the performance under a freezing-temperature environment.

Each of the electrically-assisted power steering devices 100 and 200 includes the rack shaft 55 movable in the vehicle widthwise direction, the pinion shaft 21 meshed with the rack shaft 55, the first housing 52 that retains therein the rack shaft 55 and the pinion shaft 21, the ball screw 30 that transmits drive force generated by the motor 41 to the rack shaft 55, and the second housing 53 that retains therein the ball screw 30. The retaining portion 57 capable of storing water is provided at the inner circumferential surface 53I of the second housing 53. The lower end surface 57X of the retaining portion 57 is located below at least the lower end surface 30L of the ball screw 30. The first end portion 57R of the retaining portion 57 in the axial direction of the rack shaft 55 is located between the belt member 39 that links the ball screw 30 with the motor 41 and the rack end stopper 54R at the motor-41 side.

By providing the retaining portion 57 below the lower end surface 30L of the ball screw 30, in other words, below the lower end surface of the belt member 39, water that enters in the second housing 53 can be trapped in the retaining portion 57. Hence, in comparison with a case in which there is no retaining portion 57, this makes it difficult for the water entering in the second housing 53 to contact the belt member 39. Since the water is not likely to contact the belt member 39, the belt member 39 is facilitated to actuate even under a low-temperature environment at which freezing occurs. Accordingly, the electrically-assisted power steering devices 100 and 200 can be provided which can maintain the performance under a freezing-temperature environment.

REFERENCE SIGNS LIST

| | |
|---|---|
| G | Meshed portion |
| S and S' | Start point |
| 11 | Steering wheel |
| 12 | Intermediate shaft |
| 21 | Pinion shaft |
| 22 | Torque sensor |
| 24 | Pinion tooth |
| 30 | Ball screw |
| 30L | Lower end surface of ball screw |
| 31 | Screw |
| 32 | Bearing |
| 35 | Driven pulley |
| 36 | Ball housing |
| 37 | Ball |
| 38 | Elastic body |
| 39 | Belt member |
| 39S | Side face of belt member |
| 41 | Motor (drive source) |
| 42 | Motor shaft |
| 45 | Drive pulley |
| 51 | Ball screw |
| 52, 252 and 352 | First housing |
| 52I | Inner circumferential surface of first housing |
| 52IG | Inner circumferential surface groove portion of first housing |
| 52IT and 252IT | Inner circumferential surface tapered portion (inclined portion) of first housing |
| 53 | Second housing |
| 53B and 53C | Convexity |
| 53I | Inner circumferential surface of second housing |
| 53S | End surface of second housing |
| 54L | Rack end stopper |
| 54R | Rack end stopper (rack end stopper at drive-source side) |
| 55 | Rack shaft (turning shaft) |
| 55T | Rack tooth (tooth of turning shaft) |
| 57, 57A, 57B and 57C | Retaining portion |
| 57AR, 57BR, 57CR and 57R | First end portion of retaining portion |
| 57AL, 57BL, 57CL and 57L | Second end portion of retaining portion |
| 57X, 57X1, 57X2 and 57X3 | Bottom portion (lower end surface of retaining portion) |
| 60 | Transmission mechanism |
| 70 | Transmission belt mechanism |
| 100, 200 | Electrically-assisted power steering device (steering apparatus) |
| 110 | Wheel |
| 120 | Knuckle |
| 130 | Tie-rod end |

The invention claimed is:

1. A steering apparatus comprising:
   a turning shaft movable in a vehicle widthwise direction;
   a pinion shaft meshed with the turning shaft;
   a first housing that retains therein the turning shaft and the pinion shaft;
   a ball screw that transmits drive force generated by a drive source to the turning shaft;
   a rack end stopper is provided at an end portion of the turning shaft at a pinion-shaft side of the turning shaft; and
   a second housing that retains therein the ball screw,
   wherein an inner circumferential surface of the first housing facing toward the turning shaft is provided with an inclined portion that continuously changes an internal diameter of the first housing, and
   wherein a portion where a tooth of the turning shaft and a tooth of the pinion shaft are meshed with each other is defined as a meshed portion, the inclined portion is formed below at least the meshed portion, the inclined portion being formed such that the internal diameter of the first housing continuously increases from a start point at a drive-source side of the meshed portion to an end point at a shaft-side of the meshed portion, wherein the end point is located at the rack end stopper side relative to the meshed portion, wherein a retaining portion capable of storing water is provided at an inner circumferential surface of the second housing, wherein a lower end surface of the retaining portion is located below at least a lower end surface of the ball screw, and wherein a first end portion of the retaining portion in an axial direction of the turning shaft is located between a belt member that links the ball screw with the drive source and a rack end stopper at the drive-source side.

2. The steering apparatus according to claim 1, wherein a second end portion of the retaining portion located at a belt-member side relative to the first end portion in the axial direction of the turning shaft is located at the pinion-shaft side relative to both side faces of the belt member in the axial direction, and is an opening opened in an end surface of the second housing at a first-housing side.

3. The steering apparatus according to claim 2, wherein the inclined portion has a groove formed therein, said groove being disposed at the pinion-shaft side relative to the start point and having an opened upper surface.

4. The steering apparatus according to claim 1, wherein a second end portion of the retaining portion located at a belt-member side relative to the first end portion in the axial direction of the turning shaft has a position in the axial direction of the turning shaft located between a position of a side face of the belt member at the pinion-shaft side and an end surface of the second housing at the pinion-shaft side.

5. The steering apparatus according to claim 4, wherein the inclined portion has a groove formed therein, said groove being disposed at the pinion-shaft side relative to the start point and having an opened upper surface.

6. The steering apparatus according to claim 1, wherein a second end portion of the retaining portion located at a belt-member side relative to the first end portion in the axial direction of the turning shaft has a same position in the axial direction of the turning shaft as a position of a side face of the belt member at the pinion-shaft side.

7. The steering apparatus according to claim 6, wherein the inclined portion has a groove formed therein, said groove being disposed at the pinion-shaft side relative to the start point and having an opened upper surface.

8. The steering apparatus according to claim 1, wherein the inclined portion has a groove formed therein, said groove being disposed at the pinion-shaft side relative to the start point and having an opened upper surface.

* * * * *